(12) United States Patent
Okazaki (10) Patent No.: US 10,095,541 B2
(45) Date of Patent: Oct. 9, 2018

(54) EXECUTING MEMORY ACCESS WHILE PERFORMING TASK SWITCHING

(71) Applicant: INTERNATIONAL BUSINESS MACHINES CORPORATION, Armonk, NY (US)

(72) Inventor: Atsuya Okazaki, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/271,345

(22) Filed: Sep. 21, 2016

(65) Prior Publication Data

US 2018/0081709 A1    Mar. 22, 2018

(51) Int. Cl.
*G06F 9/46*        (2006.01)
*G06F 12/122*    (2016.01)

(52) U.S. Cl.
CPC ............ *G06F 9/461* (2013.01); *G06F 12/122* (2013.01); *G06F 2212/69* (2013.01)

(58) Field of Classification Search
None
See application file for complete search history.

(56) References Cited

U.S. PATENT DOCUMENTS

| 8,676,004 | B1 | 3/2014 | Urata et al. |
| 9,306,698 | B2 | 4/2016 | Chen et al. |

| 2003/0193955 | A1* | 10/2003 | Beshai ............... H04J 14/0227 370/395.4 |
| 2004/0037558 | A1* | 2/2004 | Beshai ............... H04Q 11/0005 398/57 |
| 2007/0081242 | A1* | 4/2007 | Kempa .................. B82Y 20/00 359/485.05 |
| 2009/0183163 | A1* | 7/2009 | Maruyama ............ G06F 9/4843 718/103 |
| 2013/0275707 | A1 | 10/2013 | Schenfeld et al. |
| 2015/0309945 | A1* | 10/2015 | Katayama ........... G06F 13/1657 711/154 |
| 2016/0025934 | A1* | 1/2016 | Martinelli ............ G02B 6/3546 398/49 |

\* cited by examiner

*Primary Examiner* — Adam Lee
(74) *Attorney, Agent, or Firm* — Tutunjian & Bitetto, P.C.; Vazken Alexanian (57) ABSTRACT

A computer-implemented method is provided for executing a memory access while performing a task switching using an optical circuit switch provided with a plurality of channels. The method includes executing, by a hardware processor, the memory access on the basis of a precedent task using a first channel of the plurality of channels. The method further includes assigning, by the hardware processor, a second channel of the plurality of channels to a subsequent task before performing the task switching. The method also includes executing, by the hardware processor, the subsequent task being executed after the precedent task upon performing the task switching. The method further includes performing, by the hardware processor, the task switching to the subsequent task to which the second channel has been assigned.

19 Claims, 8 Drawing Sheets

MEMORY AFFINITY TABLE (MAT) 231

| TASK ID | PHYSICAL ADDRES RANGE | |
|---|---|---|
| ... | | |
| 33597 | 0xFF | ----▶ OCS 30 |
| 69382 | 0x4A | ◀---- MAR 217 |
| ... | | |

FIG.4B

TASK SCHEDULING TABLE (TST) 233

| CPU CORE ID | CURRENT TASK ID | NEXT TASK ID |
|---|---|---|
| 0 | 87185 | 89055 |
| 1 | 69382 | 33597 |
| 2 | 93822 | 93822 |
| ... | | |

EXECUTING MEMORY ACCESS WHILE PERFORMING TASK SWITCHING

BACKGROUND

Technical Field

The present invention generally relates to executing memory access. More particularly to executing memory access while performing a task switching.

Description of the Related Art

Retrieving data from disk storage can be a cause of delay in data processing. In-memory processing can eliminate the need to retrieve data from disk storage. However, memories that are large enough to support in-memory processing can have bandwidth capabilities that remain underutilized with conventional I/O buses and links.

SUMMARY

According to an embodiment of the present invention, a computer-implemented method is provided for executing a memory access while performing a task switching using an optical circuit switch provided with a plurality of channels. The method includes executing, by a hardware processor, memory access on the basis of a precedent task using a first channel of the plurality of channels. The method further includes assigning, by the hardware processor, a second channel of the plurality of channels to a subsequent task before performing the task switching. The method also includes executing, by the hardware processor, the subsequent task after the precedent task upon performing the task switching. The method further includes performing, by the hardware processor, the task switching to the subsequent task to which the second channel has been assigned.

According to another embodiment of the present invention, a system is provided for executing memory access while performing a task switching using an optical circuit switch provided with a plurality of channels. The system further includes an access controller configured to execute the memory access on the basis of a precedent task using a first channel of the plurality of channels. The system also includes an assign controller configured to assign a second channel of the plurality of channels to a subsequent task before performing the task switching. The subsequent task is executed after the precedent task upon performing the task switching. The system further includes a switch controller configured to perform the task switching to the subsequent task to which the second channel has been assigned.

According to yet another embodiment of the present invention, an optical circuit switch is provided that is configured to perform a channel switching on a basis of a task switching. The optical circuit switch further includes a plurality of channels for memory access. The plurality of channels include a first channel configured to be assigned to a precedent task. The plurality of channels also include a second channel configured to be assigned to a subsequent task. The subsequent task is executed after the precedent task upon performing the task switching. The assignment of the second channel is executed before performing the task switching. The optical circuit switch further includes a controller configured to perform a channel switching from the first channel to the second channel having been assigned before the task switching.

DETAILED DESCRIPTION

Hereinafter, exemplary embodiments of the present invention will be described in detail with reference to the attached drawings.

It is to be noted that the embodiments of the invention are not limited to these exemplary embodiments given below and can be implemented with various modifications within the scope of the embodiments of the invention. In addition, the drawings used herein are for purposes of illustration, and may not show actual dimensions.

Figure 1:
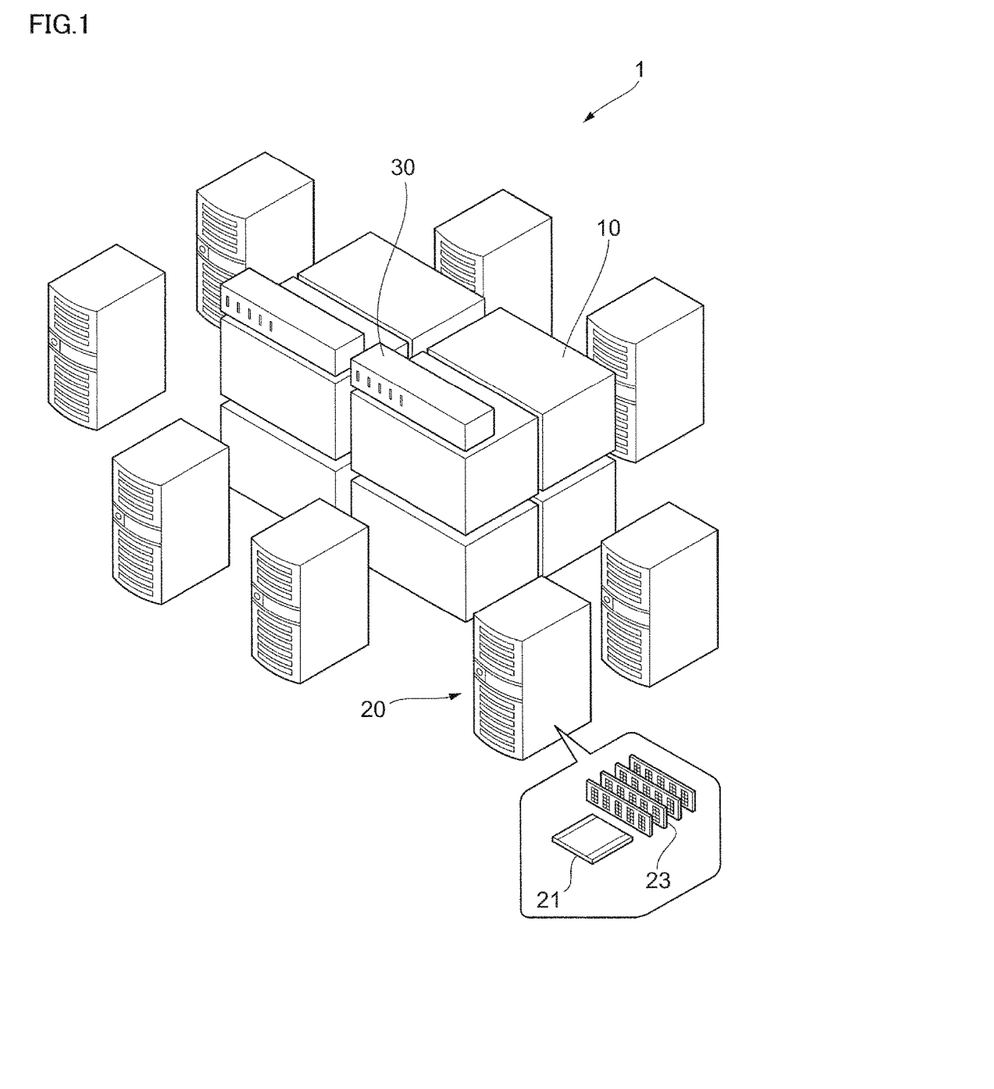
FIG. 1 depicts an example of a memory link system, in accordance with an embodiment of the present invention.

FIG. 1 depicts an example of a memory link system 1 according to an exemplary embodiment. As shown in FIG. 1, the memory link system 1 can include big data memory (BDM) units 10, servers 20, and optical circuit switches (OCSs) 30.

The big data memory units 10 can be provided in the memory link system 1 due to a growing demand for processing "big data" (BD), which can require support of in-memory processing that is several magnitudes larger than previously required.

The term "in-memory" is a state where all program codes to be used during execution are loaded into a memory before the execution of the program so that the program codes do not need to be read from a storage such as hard disks during the execution. Although in-memory processing requires implementation of a sufficiently large memory as compared with the size of the program, it eliminates the need for overlays and disk accesses using a virtual memory. This enables to increase execution speed.

The servers 20 can each include a processor 21 and a local memory 23. The detailed configuration of the servers 20 will be described later.

The optical circuit switches 30 can change routings of the optical memory links LO (described later). The optical circuit switches 30 can be a Micro Electro Mechanical Systems (MEMS). The configuration of the optical circuit switches 30 will be described later.

The memory link system 1 shown in FIG. 1 can include eight big data memory units 10, eight servers 20, and two optical circuit switches 30. Further, in FIG. 1, the servers 20 are provided to surround the big data memory units 10. The number of these components, i.e. the big data memory units 10, the servers 20 and the optical circuit switches 30, is not limited to the configuration shown in FIG. 1. For example, the memory link system 1 can include a single optical circuit switch 30.

Here, the configuration of the memory link system 1 can be called symmetric multiprocessing (SMP), which is a system with a large-sized electrical/optical memory link. SMP is a "shared memory parallel computing (multiprocessing)" in which a physical memory is shared and managed. In SMP, multiple processors perform parallel processing. The processing is symmetrically and evenly allocated to all CPUs without relying on asymmetrically allocating processing to particular CPUs.

Figure 2:
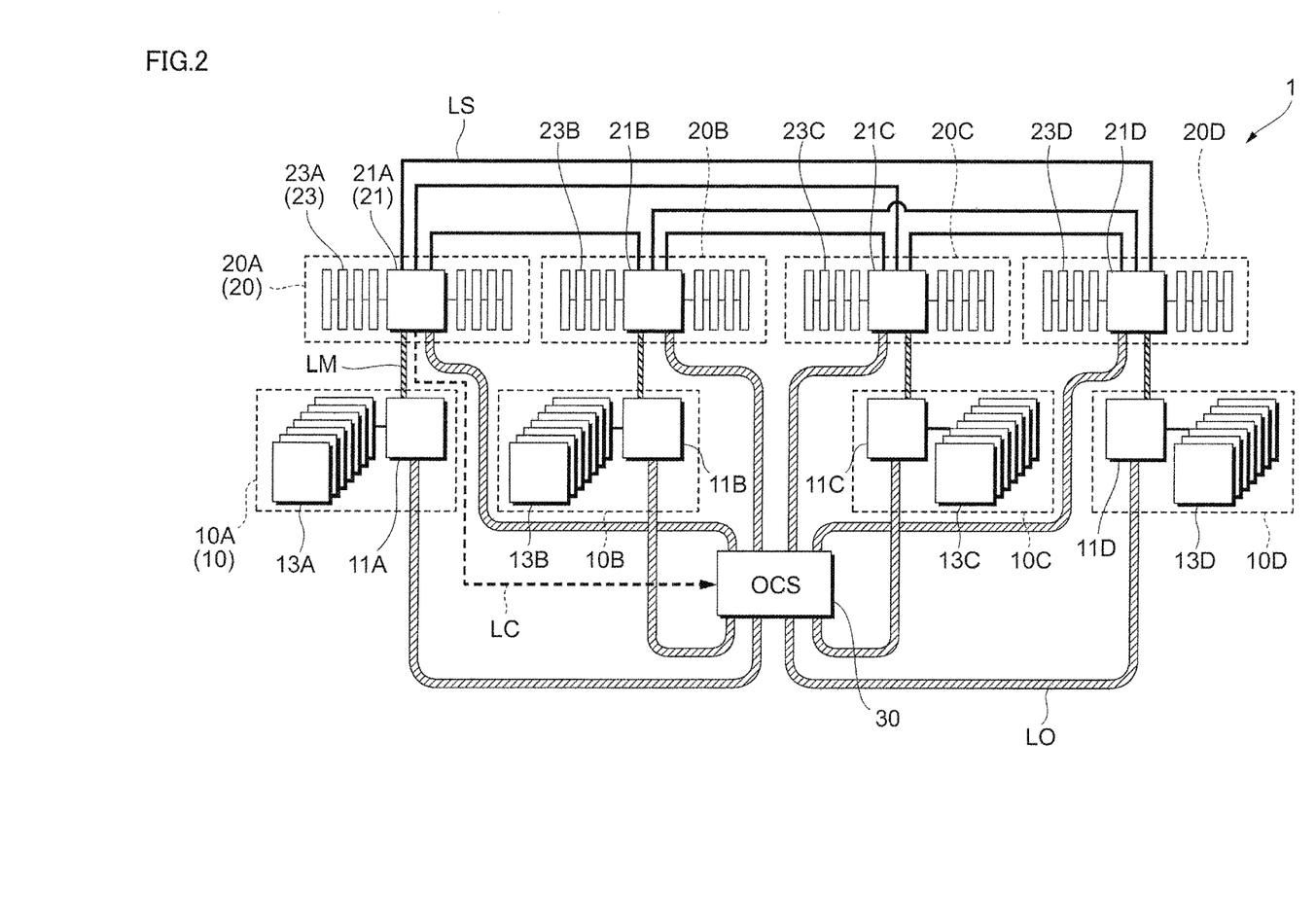
FIG. 2 depicts a linkage diagram of the memory link system, in accordance with an embodiment of the present invention.

FIG. 2 depicts a linkage diagram of the memory link system 1 according to the exemplary embodiment. Note that FIG. 2 shows half part of the configuration of the memory link system 1 illustrated in FIG. 1. Specifically, FIG. 2 illustrates the linkages among four big data memory units 10, four servers 20 and an optical circuit switch 30.

As shown in FIG. 2, the big data memory units 10 (a big data memory unit 10A to a big data memory 10D) can each include a big data memory controller 11 (a big data memory controller 11A to a big data memory controller 11D) and a big data memory 13 (a big data memory 13A to a big data memory 13D). The servers 20 (a server 20A to a server 20D) can each include a processor 21 (a processor 21A to a processor 21D) and a local memory 23 (a local memory 23A to a local memory 23D).

Electrical Symmetric Multiprocessing (SMP) links LS are formed as electrical linkages so that each pair among the processors 21 (the processor 21A to the processor 21D) is linked. Further, the electrical SMP links LS are connected to every CPU (not shown) provided in the processors 21 through an SMP bus.

Electrical memory links LM are formed as electrical linkages between the processors 21 (the processor 21A to the processor 21D) and the corresponding big data memory controllers 11 (the big data memory controller 11A to the big data memory controller 11D).

Optical memory links LO are formed as optical linkages between the processors 21 (the processor 21A to the processor 21D) and the optical circuit switch 30. The optical memory links LO are also formed between the big data memory controllers 11 (the big data memory controller 11A to the big data memory controller 11D) and the optical circuit switch 30.

Optical circuit switch control links (control lines) LC are formed as electrical linkages between the processors 21 (the processor 21A to the processor 21D) and the optical circuit switch 30. Note that the optical circuit switch control links LC between each of the processors 21B to 21D and the optical circuit switch 30 are not shown in FIG. 2.

Here, not all routings of the optical memory links LO are required to be permanently established but may be selectively established (switched) by the optical circuit switch 30. Various commands such as routing commands are issued from the processors 21 to the optical circuit switch 30 through the optical circuit switch control links LC.

Besides the configuration shown in FIG. 2, the processor 21 can directly control the big data memory 13 to omit the big data memory controller 11. Note that the big data memory 13 can be dedicated to, or simply assigned to, the processor 21.

Figure 3:
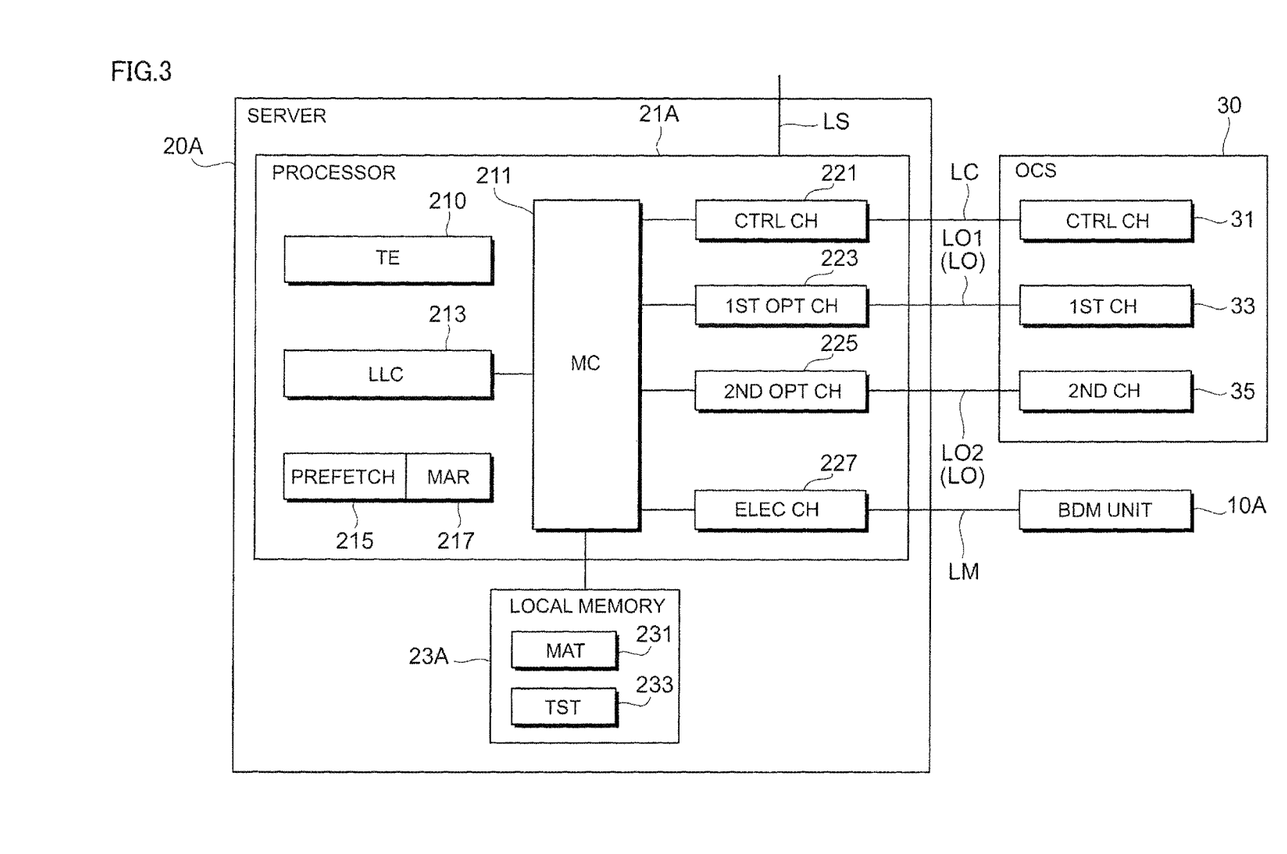
FIG. 3 depicts a block diagram of the server, in accordance with an embodiment of the present invention.

FIG. 3 depicts a block diagram of the server 20A and the optical circuit switch 30. Note that FIG. 3 shows the configuration of the server 20A and the optical circuit switch 30 as an example. The server 20B, the server 20C, and the server 20D can be similarly configured.

Figure 4A:
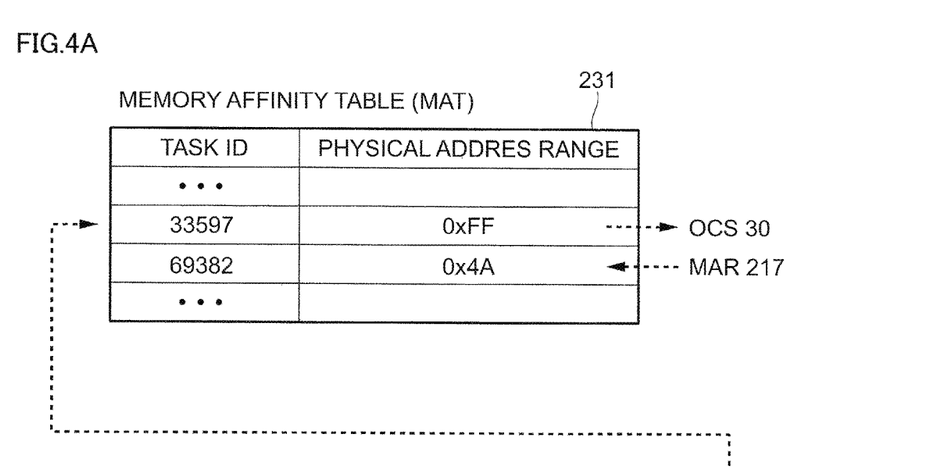
FIG. 4A depicts an example of a memory affinity table, in accordance with an embodiment of the present invention.
Figure 4B:
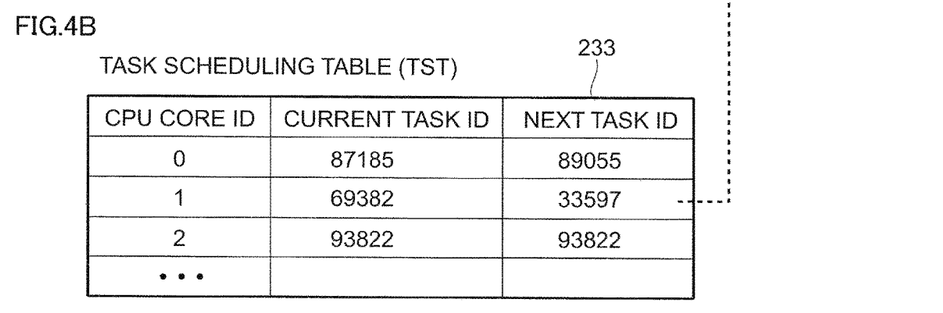
FIG. 4B depicts an example of a task scheduling table, in accordance with an embodiment of the present invention.

FIG. 4A depicts an example of a memory affinity table. FIG. 4B depicts an example of a task scheduling table.

As shown in FIG. 3, the processor 21A of the server 20A can include a task executor (TE) 210, a memory controller (MC) 211, a last level cache (LLC) 213, a prefetch circuit (PREFETCH) 215, a memory affinity register (MAR) 217, a control channel (CTRL CH) 221, a first optical channel (1 ST OPT CH) 223, a second optical channel (2 ND OPT CH) 225, and an electrical channel (ELEC CH) 227.

The task executor (TE) 210 executes tasks. Further, the task executor 210 controls the currently executed tasks.

The memory controller (MC) 211 controls the local memory 23A. The memory controller 211 also controls the big data memory unit (BDM) 10A through the electrical channel 227 and the electrical memory link LM. The memory controller 211 is an example of the access controller, the assign controller, the switch controller, and the controller.

The last level cache (LLC) 213 stores data corresponding to original data stored elsewhere or computed earlier. To reduce memory access latency, once data is stored in the last level cache 213, future use can be made by accessing a cached copy.

The prefetch circuit 215 is a circuit for executing a prefetch in which reference target data stored in the local memory 23A is fetched in advance, and thereby a waiting time for referring to the data can be reduced. As methods for realizing prefetch, prefetch using software (controlled by CPU cores (not shown)), and/or prefetch using hardware (hardware prefetch mechanism) may be applicable. The prefetch circuit 215 and the memory controller 211 is an example of the prefetch controller.

The memory affinity register 217 holds an address most recently prefetched in the last level cache 213. The memory affinity register (MAR) 217 can be accessed by software (an operating system). If a prefetch instruction is issued, for example by the software, the memory affinity register 217 is updated. In other words, the prefetch instruction updates the memory affinity register 217 as well. In this example, instead of the most recently prefetched address, the memory affinity register 217 can hold the most frequently perfected address during task executions.

The control channel 221 is connected to the optical circuit switch control link LC. The first optical channel 223 is connected to a first optical memory link LO1, which is a part of the optical memory links LO. The second optical channel 225 is connected to a second optical memory link LO2, which is another part of the optical memory links LO. The electrical channel 227 is connected to the electrical memory link LM.

The local memory 23A can hold a memory affinity table (MAT) 231 and a task scheduling table (TST) 233.

As shown in FIG. 4A, the memory affinity table 231 can include information on the relationship between the tasks executed by the processor 21A and physical address ranges most recently prefetched in the last level cache 213. More specifically, in the memory affinity table 231, the physical address range is stored in association with a corresponding TASK ID. Here, if the operating system (OS), i.e. the processor 21A, completes one task and then switches tasks, the operating system reads the memory affinity register 217 and updates the memory affinity table 231.

As shown in FIG. 4B, the task scheduling table 233 can include information on the relationship between the CPU cores (not shown) in the processor 21A and the tasks executed by the processor 21A. In the task scheduling table 233, a set of a CURRENT TASK ID and a NEXT TASK ID is stored in association with a corresponding CPU CORE ID. For example, in the line of the CPU CORE ID "1", the CURRENT TASK ID is "69382" and the NEXT TASK ID is "33597". The NEXT TASK ID can be copied into the column of the memory affinity table 231.

Returning to FIG. 3, the optical circuit switch 30 can include a control channel (CTRL CH) 31, a first channel (1 ST CH) 33, and a second channel (2 ND CH) 35. The control channel 31 is connected to the control channel 221 of the processor 21A via the optical circuit switch control link LC. The first channel 33, as an example of the first channel, is connected to the first optical channel 223 of the processor 21A via the first optical memory link LO1. The second channel 35, as an example of the second channel, is connected to the second optical channel 225 of the processor 21A via the second optical memory link LO2.

In an exemplary embodiment, the processor 21A includes multiple optical channels, i.e. the first optical channel 223 and the second optical channel 225. At least two optical circuit switch channels per processor core are provided. One of the optical circuit switch channels is for running task (current task), and the other (another one) of the optical circuit switch channels is for the next task (subsequent task).

Figure 5:
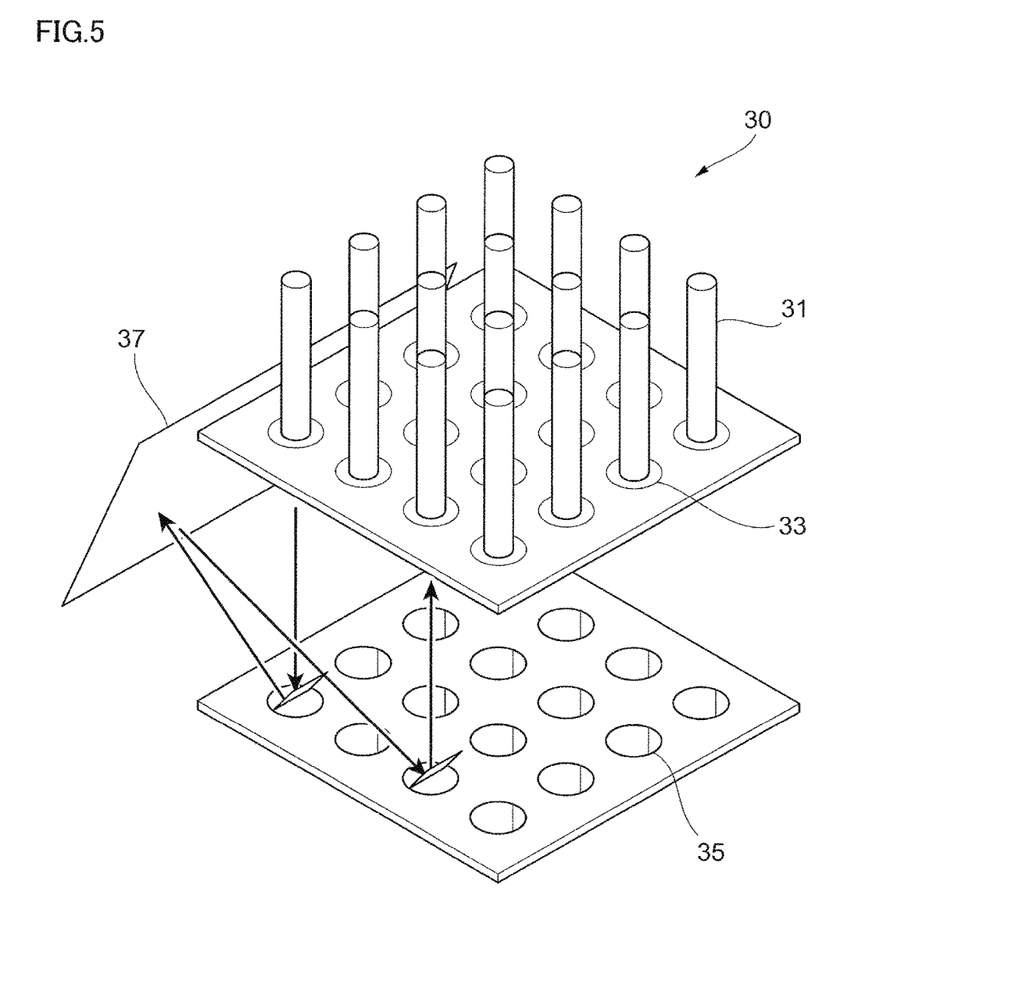
FIG. 5 depicts an example of a configuration of the optical circuit switch, in accordance with an embodiment of the present invention.

FIG. 5 depicts an example of a configuration of the optical circuit switch 30. As shown in FIG. 5, the optical circuit switch 30 can include optical fibers 31, imaging lens 33, MEMS mirrors 35, and a reflector 37.

The optical fibers 31 constitutes a part of the optical memory links LO to transmit the light signal. The imaging lens 33 converts emitted light from the optical fibers 31 to circular collimated light. Each of the MEMS mirrors 35 is capable of adjusting its physical angle. The reflector 37 reflects the light from one of the MEMS mirrors 35 to another of the MEMS mirrors 35.

The light from one of the optical fibers 31 at the input side passes imaging lens 33 and then the light is reflected at one of the MEMS mirrors 35, the reflector 37, and another one of the MEMS mirrors 35, to reach another of the optical fibers 31 at the output side. The optical circuit switch 30 switches pairs of the optical fibers 31 to change routings of the optical memory links LO by adjusting the angle of the MEMS mirrors 35. Changing the angle of the MEMS mirrors 35 enables adjusting the direction of the reflected light at the MEMS mirrors 35 for switching pairs of the optical fibers 31.

In an embodiment, the MEMS mirror 35 physically changes (rotates) its angle to change the routing of the optical memory links LO. For example, the time required for rotation of a MEMS mirror 35 can be 30 ms or more. Further, the angle of the MEMS mirror 35 is set on the basis of the address of the memory to which the optical circuit switch 30 is required to establish the optical route.

Figure 6:
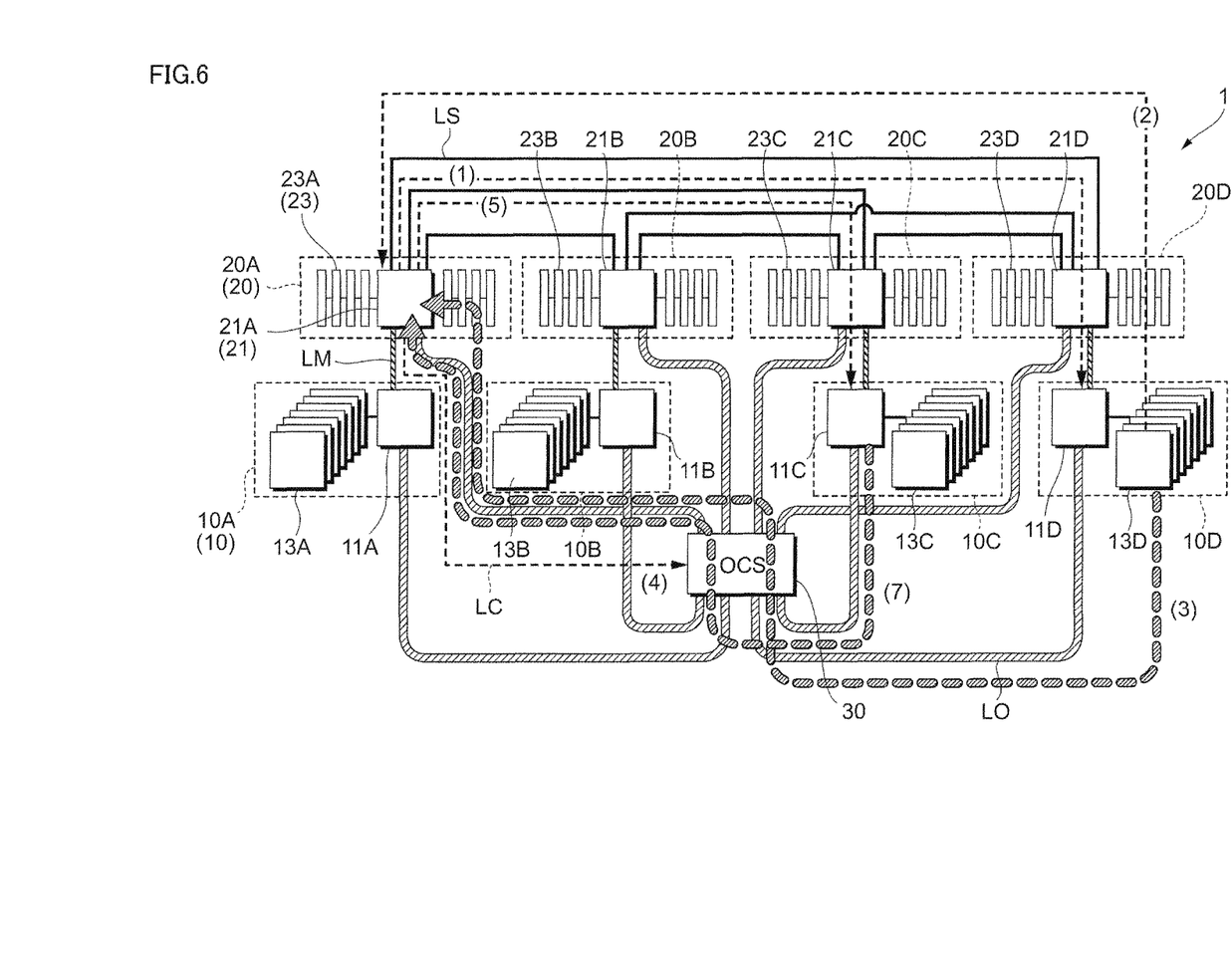
FIG. 6 depicts an operation to change routings of the optical memory links, in accordance with an embodiment of the present invention.
Figure 7:
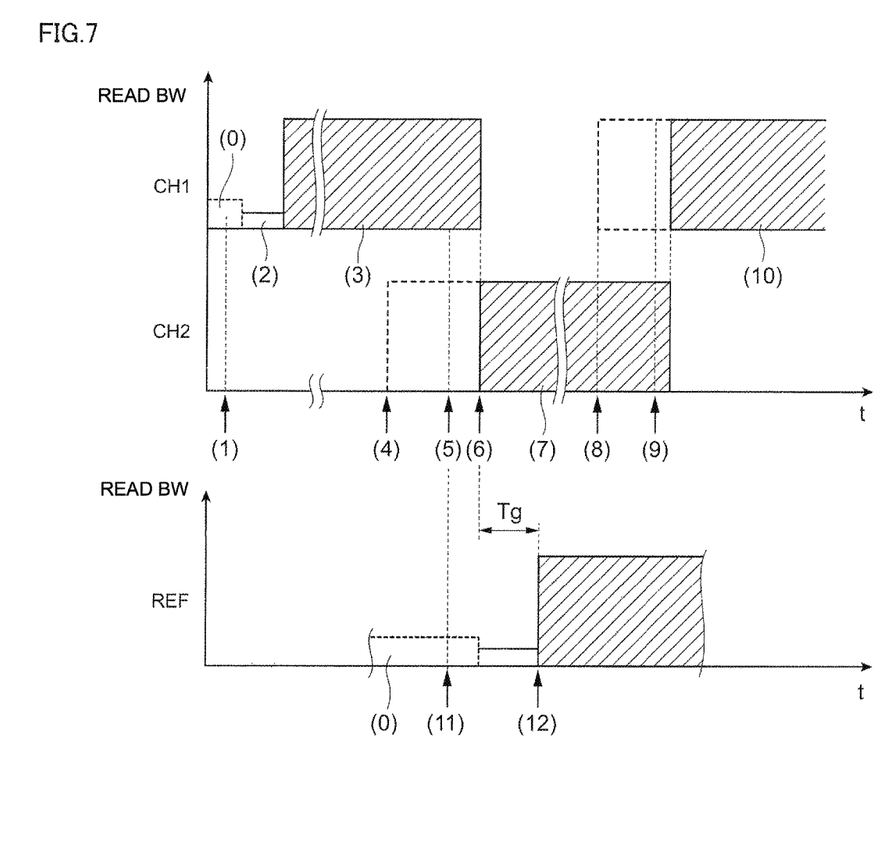
FIG. 7 depicts the time chart of the operation to change routings of the optical memory links, in accordance with an embodiment of the present invention.

FIG. 6 depicts an operation to change routings of the optical memory links LO. FIG. 7 depicts the time chart of the operation to change routings of the optical memory links LO. In FIG. 7, a vertical axis represents an effective read bandwidth and a horizontal axis represents time.

An example to change routings of the optical memory links LO due to the task switching will be described. In the example, a huge-memory read request (precedent read request) is issued from the software running on the processor 21A to the big data memory 13D in a precedent task, and then another huge-memory read request (subsequent read request) is issued from the software running on the processor 21A to the big data memory 13C in a subsequent task.

When the precedent read request is issued, the route from the processor 21A to the big data memory 13D via the optical circuit switch 30 has not been established and a precedent transaction, e.g. local memory access, is being conducted by the processor 21A (refer to the reference sign (0) in FIG. 7).

As shown with the reference sign (1) in FIGS. 6 and 7, the processor 21A sends a command of the precedent read request to the big data memory controller 11D of the big data memory unit 10D via the processor 21D through the electrical SMP link LS. At the same time, the processor 21A sends a routing command to the optical circuit switch 30 through the optical circuit switch control link LC so as to establish the optical memory link LO between the processor 21A and the big data memory 13D.

Here, the routing command is sent "at the same time" (e.g., concurrently, immediately after, or immediately before) in order to change routings as quickly as possible, however the timing of sending the routing command is not limited thereto.

Then, as shown with the reference sign (2) in FIGS. 6 and 7, the big data memory controller 11D reads data from the big data memory 13D according to the precedent read request command and sends the read data to the processor 21A through the processor 21D and the electrical SMP link LS.

Here, the electrical SMP link LS has a narrower bandwidth than the optical memory link LO but has a shorter access latency than the optical memory link LO. Further, an electrical read response via the processor 21D does not need to wait for establishment of the optical memory link LO between the processor 21A and the big data memory 13D.

In response to the routing command from the processor 21A, the optical circuit switch 30 establishes the optical memory link LO between the processor 21A and the big data memory 13D. In this example, the first optical memory link LO1 (refer to FIG. 3) is established with the first channel 33 of the optical circuit switch 30.

In response to recognizing that the routing between the processor 21A and the big data memory 13D has been established in the optical circuit switch 30, the big data memory controller 11D directly transfers the next (remaining) data to the processor 21A through the first optical memory link LO1 (with a high bandwidth) via the optical circuit switch 30 instead of the electrical SMP link LS (refer to the reference sign (3) in FIGS. 6 and 7). Furthermore, switching is made from the process performed through the electrical SMP link LS to the process performed through the optical memory link LO.

Further, after recognizing the establishment of the routing between the processor 21A and the big data memory 13D in the optical circuit switch 30, the processor 21A sends an OCS pre-switch command to the optical circuit switch 30 through the optical circuit switch control link LC (refer to the reference sign (4) in FIGS. 6 and 7). In response to the OCS pre-switch command, the optical circuit switch 30 starts to adjust the angle of the MEMS mirrors 35 to prepare for establishing another one of the optical memory links LO before actually switching the tasks.

More specifically, the optical circuit switch 30 prepares the route between the processor 21A and the big data memory 13C via the second optical memory link LO2 (refer to FIG. 3) before actually switching the tasks. Accordingly, the processor 21A sets the channel, e.g. the second channel 35, which is not being used in the current task (the precedent task), to the memory address lastly prefetched in the last level cache 213. The processor 21A conducts this switching on the basis of the memory affinity register 217 (refer to FIG. 3). Here, instead of the lastly prefetched memory address, the processor 21A can set the channel to the memory address which is frequently accessed by the subsequent task to be executed after the task switching.

Then, as shown with the reference sign (5) in FIGS. 6 and 7, the processor 21A sends a subsequent read request command to the big data memory controller 11C via the processor 21C through the electrical SMP link LS. At the same time, the processor 21A sends a routing command to the optical circuit switch 30 through the optical circuit switch control link LC so as to change the optical memory links LO, from the first optical memory link LO1 to the second optical memory link LO2.

Then, in response to recognizing that the routing between the processor 21A and the big data memory 13C has been established in the optical circuit switch 30 (refer to the reference sign (6) in FIG. 7), the big data memory controller 11C transfers the subsequent data to the processor 21A through the optical memory link LO (refer to the reference sign (7) in FIGS. 6 and 7).

This high bandwidth memory link is available just after the task switching because the second optical memory link LO2 has already been established before the actual task switching. That is, the task switching is made continuously without an interruption between the successive tasks. However, the switching "continuously without an interruption between the successive processes" is not essential to carrying out the present embodiment. Furthermore, technical definition of the term "establishment (of a route/routing)" should be flexibly interpreted in accordance with the present embodiment.

After changing the optical memory links LO, the processor 21A sends another OCS pre-switch command to the optical circuit switch 30 through the optical circuit switch control link LC (refer to the reference sign (8) in FIG. 7). Then, as indicated by the reference sign (9) in FIG. 7, the processor 21A sends another routing command to the optical circuit switch 30 through the optical circuit switch control link LC to change the optical memory links LO, for example from the second optical memory link LO2 to the first optical memory link LO1 (refer to the reference sign (10) in FIG. 7).

Here, as shown in a reference example (REF) below an embodiment in FIG. 7, if the OCS pre-switch command is not issued, the optical circuit switch 30 requires time to adjust the angle of the MEMS mirrors 35 after the read request command is issued from the processor 21A (refer to the reference sign (11) in FIG. 7). This causes more time to establish the routing between the processor 21A and the big data memory 13C after issuing the read request. Further, the above embodiment can eliminate a bandwidth response time gap Tg (refer to FIG. 7) compared to the reference example.

Recently, disaggregated server architecture has been emerging to improve hardware resource utilization in a "rack scale". In the architecture, the hardware resources such as processors, memories, and storages are physically disaggregated, but the architecture logically serves as virtual machines with appropriate resource sizes for each workload.

Disaggregation in storages and networks has been developed in the market. However, disaggregation in memories is currently still challenging because the memories require middle-distance high-bandwidth link, e.g. the optical link, and low-latency switching, e.g. electrical link.

Optical and electrical hybrid memory link and switching architecture, such as the memory link system 1, can be applicable to high-bandwidth memory link with fine-grain and dynamic switching. However, as mentioned above, this architecture generally requires time for the MEMS mirrors 35 to change the angle. For example, changing the angle of the MEMS mirror 35 may take 30 ms or more. This causes a drop in effective read bandwidth (temporal degrading in bandwidth). Furthermore, this causes a long memory access latency.

Alternatively, in the memory link system 1 according to the present embodiment, the processor 21A predicts memory affinity (addresses frequently accessed by each task) to establish the optical memory links LO before actually switching the tasks. This enables overcoming the memory access latency (latency bottleneck) in the above mentioned architecture. Additionally, the memory link system 1 can shorten the switching time for the optical circuit switch 30.

Figure 8:
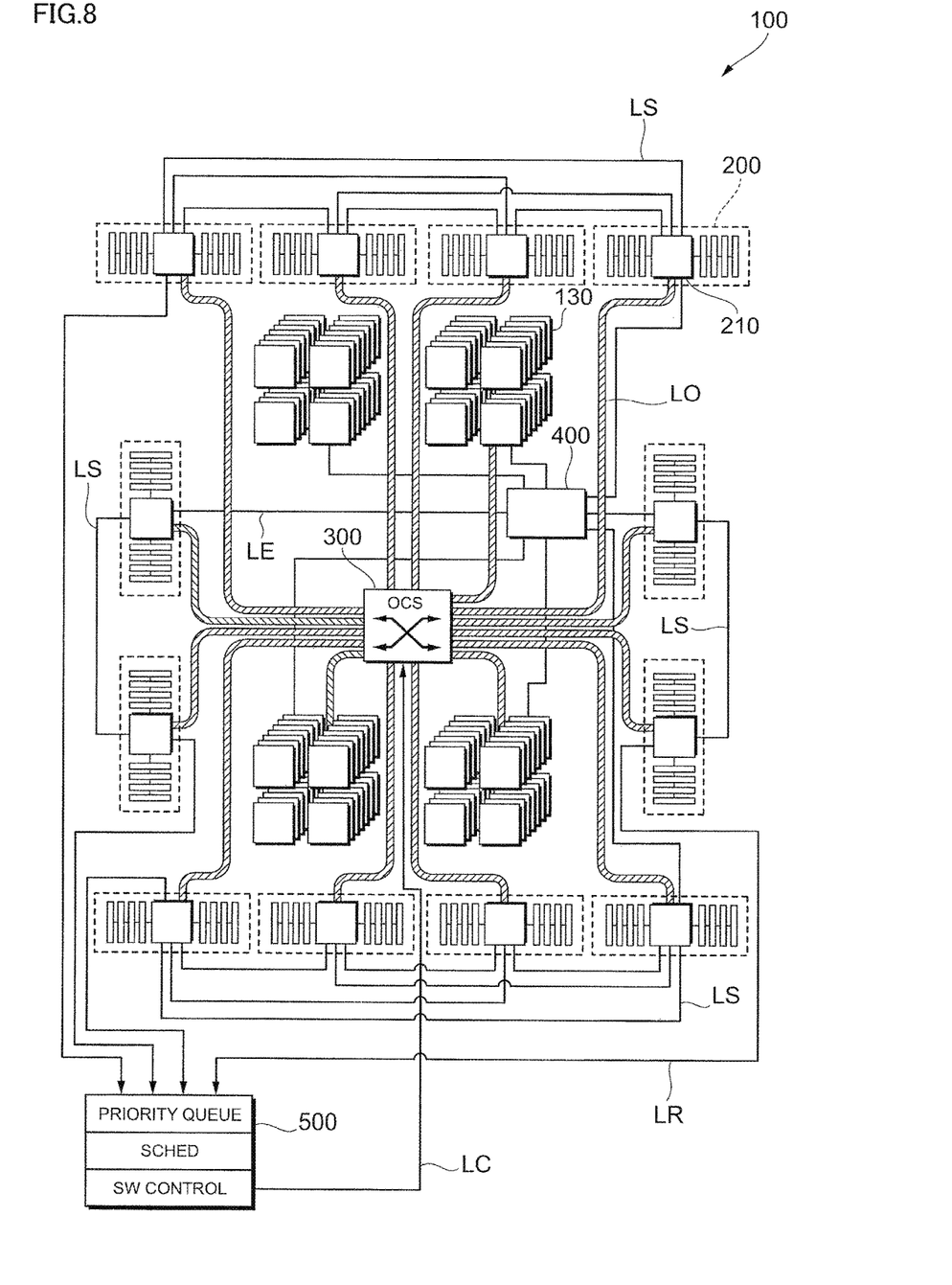
FIG. 8 depicts a linkage diagram of the memory link system, in accordance with an embodiment of the present invention.

FIG. 8 depicts a linkage diagram of the memory link system 100 according to another exemplary embodiment. As shown in FIG. 8, the memory link system 100 is a "large-sized configuration". The memory link system 100 can include big data memories 130, servers 200, an optical circuit switch 300, an electrical IO switch 400, and an arbiter 500.

SMP links LS are formed among the processors 210. Electrical IO links LE are formed between the processors 210 of the servers 200 and the electrical IO switch 400. The Electrical IO links LE are also formed between the big data memories 130 and the electrical IO switch 400. Optical circuit switch request links LR are formed between the processors 210 and the arbiter 500. Optical circuit switch control link LC is formed between the arbiter 500 and the optical circuit switch 300. Optical memory links LO are formed between the processors 210 and the optical circuit switch 300. The optical memory links LO are also formed between the big data memories 130 and the optical circuit switch 300.

The links are configured so that an optical circuit switch request can be received from each processor 210 and the arbiter 500 arbitrates so that a routing can be established by the optical circuit switch 300. Scheduling (SCHED) can be performed in the arbiter 500 according a priority queue to perform software control (SW CONTROL). The optical circuit switch 300 can help the processors 210 perform processes on the big data memories 130 other than a memory (big data memory 130) dedicated to the processor 210 itself.

Here, the processors 210 include the above mentioned memory affinity register 217 (refer to FIG. 3). Using the memory affinity register 217 in the processors 210, the adjustment of the angle of the MEMS mirror 35 for the subsequent task has been executed before actually switching the tasks. Note that instead of this configuration, some of the processors 210 can omit the memory affinity register 217.

In the above exemplary embodiments, the scheme on the operating system (OS) layer is described. It is possible to apply the same scheme on a virtual machine monitor (VMM) layer, and implement disaggregated servers including memories. In the case that VM-to-physical memory address range may be mapped 1-to-1, the VMM maintains only the memory affinity table 231. This enables to omit the above mentioned memory affinity register 217.

In the above exemplary embodiments, the OCS pre-switch command to the optical circuit switch 30 is issued when the data transfer is conducted through the optical memory link LO (refer to the reference signs (4) and (8) in FIG. 7). However, the issuing timing of the OCS pre-switch command timing is not limited thereto as long as the issuing timing of the OCS pre-switch command is before the issuing timing of the subsequent read request command (refer to the reference signs (5) and (9) in FIG. 7).

For example, the OCS pre-switch command to the optical circuit switch 30 can be issued when the local memory access is being conducted by the processor 21A (refer to the reference sign (0) in FIG. 7), or the read data is transferred through the processor 21D and the electrical SMP link LS (refer to the reference sign (2) in FIG. 7). The time between the OCS pre-switch command timing and the subsequent read request command (the time gap between reference signs (4) and (5) in FIG. 7) can be longer than the time required for changing the angle of the MEMS mirrors 35.

Further, in case that the link establishment is completed after the timing of the task switching due to the late rotation speed of the MEMS mirrors 35, the number of channels per core can be increased. The increased channels enable switching to a memory for a task after the subsequent task (next task) to start in advance. This configuration is beneficial to a low-latency many-channel optical circuit switch 30, such as low-cost high-dense MEMS.

Further, when there are enough optical circuit switch channels, surplus channels can be set (connected) to multiple addresses which are frequently prefetched in the last level cache 213.

When the same address range is utilized even after the task switching such as in memory intensive workloads, two or more channels can be utilized after the task switching. For example, two channels are utilized to be combined as a double-band channel.

Further, in the above exemplary embodiments, the subsequent task (next task) is prefetched on the basis of the task scheduling table 233, but the prefetch process is not limited thereto. For example, the subsequent task can be prefetched on the basis of a task queue.

Further, in the above exemplary embodiments, the last level cache 213 is provided close to the memory controller 211, but the position of the last level cache 213 is not limited thereto. For example, the last level cache 213 can be provided in the memory controller 211.

The embodiments of the invention can be a system, a method, and/or a computer program product. The computer program product can include a computer readable storage medium (or media) having computer readable program instructions thereon for causing a processor to carry out aspects of the embodiments of the invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments of the invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the embodiments of the invention.

Aspects of the embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Here, embodiments of the invention can be realized using all hardware or all software. It can also be realized using a combination of both hardware and software. The embodiments of the invention can also be realized as a computer, data processing system, or computer program product. The computer program product can be stored and distributed on a non-transitory computer-readable medium. Here, the medium can be an electronic, magnetic, optical, electromagnetic, infrared, or semiconductor system (device or equipment), or a transmission medium. Examples of the non-transitory computer-readable medium include semiconductors, solid-state storage devices, magnetic tape, removable computer diskettes, random-access memory (RAM), read-only memory (ROM), rigid magnetic disks, and optical disks. Examples of optical disks at the present time include compact disk read-only memory (CD-ROM) disks, compact disk read/write (CD-R/W) disks, and DVDs.

The embodiments of the invention have been explained above using an exemplary embodiment, but the technical scope of the embodiments of the invention is not limited in any way by this exemplary embodiment. It should be clear to a person of skill in the art that various modifications and substitutions can be made without departing from the spirit and scope of the embodiments of the invention.

What is claimed is:

1. A computer-implemented method for executing a memory access while performing a task switching using an optical circuit switch including a plurality of channels, the method comprising:
   executing, by a hardware processor, the memory access on the basis of a precedent task using a first channel of the plurality of channels;
   assigning, by the hardware processor, a second channel of the plurality of channels to a subsequent task before performing the task switching;
   executing, by the hardware processor, the subsequent task after the precedent task upon performing the task switching; and
   performing, by the hardware processor, the task switching from the precedent task to the subsequent task to which the second channel has been assigned during the memory access.

2. The computer-implemented method as recited in claim 1, wherein the second channel is a channel currently assigned in a previously performed task switching.

3. The computer-implemented method as recited in claim 1, wherein the optical circuit switch further comprises a mirror, wherein a mirror angle is adjustable for the task switching, and is adjustable to the assigned second channel, before the task switching.

4. The computer-implemented method as recited in claim 1, further comprising executing a prefetch of an address of a memory for the subsequent task before the task switching, wherein the second channel is set to an address most recently prefetched.

5. The computer-implemented method as recited in claim 1, further comprising executing a prefetch of an address of a memory for the subsequent task before the task switching, wherein the second channel is set to a frequent address, the frequent address being most frequently prefetched.

6. The computer-implemented method as recited in claim 1, further comprising: preparing at least one processor provided with a plurality of optical channels; configuring the processor to execute the memory access; and connecting the optical channels to the first channel and the second channel.

7. The computer-implemented method as recited in claim 1, further comprising: preparing at least one processor provided with a plurality of optical channels; configuring the processor to execute the memory access in a disaggregated server; prefetching, by the processor, an address of a memory for the subsequent task before the task switching; and setting the second channel to an address most recently prefetched, wherein the optical channels include the first channel and the second channel.

8. A system for executing memory access while performing a task switching using an optical circuit switch including a plurality of channels, the system comprising:
   an access controller configured to execute the memory access on the basis of a precedent task using a first channel of the plurality of channels;
   an assign controller configured to assign a second channel of the plurality of channels to a subsequent task before performing the task switching, the subsequent task being executed after the precedent task upon performing the task switching; and
   a switch controller configured to perform the task switching from the precedent task to the subsequent task to which the second channel has been assigned during the memory access.

9. The system as recited in claim 8, wherein the second channel is currently assigned in a previously performed task switching.

10. The system as recited in claim 8, wherein the optical circuit switch includes a mirror, wherein a mirror angle is adjustable for the task switching, and is adjustable to the assigned second channel before the task switching.

11. The system as recited in claim 8, further comprising: a prefetch controller configured to execute a prefetch of an address of a memory for the subsequent task before the task switching, wherein the second channel is set to an address most recently prefetched.

12. The system as recited in claim 8, further comprising: a prefetch controller configured to execute a prefetch of an address of a memory for the subsequent task before the task switching, wherein the second channel is set to a frequent address, wherein the frequent address is the address most frequently prefetched.

13. The system as recited in claim 8, further comprising: a processor provided with a plurality of optical channels, wherein the processor is configured to execute the memory access; and the optical channels are connected to the first channel and the second channel.

14. An optical circuit switch configured to perform a channel switching on a basis of a task switching, the optical circuit switch comprising:
   a plurality of channels for memory access, including a first channel configured to be assigned to a precedent task, and a second channel configured to be assigned to a subsequent task, wherein the subsequent task is executed after the precedent task upon performing the task switching, and the assignment of the second channel is executed before performing the task switching; and
   a controller configured to perform a channel switching from the first channel to the second channel having been assigned before the task switching, wherein a switch controller performs the task switching from the precedent task to the subsequent task to which the second channel has been assigned during a memory access.

15. The optical circuit switch as recited in claim 14, wherein the second channel is set to a channel currently assigned in a previously performed task switching.

16. The optical circuit switch as recited in claim 14, further comprising a mirror, wherein a mirror angle is adjustable for the task switching and is adjustable to the assigned second channel before the task switching.

17. The optical circuit switch as recited in claim 14, wherein the controller is configured to receive a routing command from a processor configured to execute a prefetch of an address of a memory for the subsequent task before the task switching, wherein the second channel is set to an address most recently prefetched by the processor.

18. The optical circuit switch as recited in claim 14, wherein the controller is configured to receive a routing command from a processor configured to execute a prefetch of an address of a memory for the subsequent task before the task switching, wherein the second channel is set to a frequent address, and the frequent address is an address most frequently prefetched by the processor.

19. The optical circuit switch as recited in claim 14, wherein the controller is configured to receive a routing command from a processor configured to execute a prefetch of an address of a memory for the subsequent task before the task switching, wherein the processor is provided with a plurality of optical channels and the optical channels are connected to the first channel and the second channel.

* * * * *